(12) United States Patent
Bamber et al.

(10) Patent No.: US 9,523,438 B2
(45) Date of Patent: Dec. 20, 2016

(54) SOLENOID VALVE ASSEMBLY WITH PILOT PRESSURE CONTROL

(71) Applicant: Eaton Corporation, Cleveland, OH (US)

(72) Inventors: Daniel Bamber, Farmington Hills, MI (US); Robert A. Dayton, Attica, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 14/808,455

(22) Filed: Jul. 24, 2015

(65) Prior Publication Data

US 2015/0330528 A1 Nov. 19, 2015

Related U.S. Application Data

(63) Continuation of application No. PCT/US2013/031123, filed on Mar. 14, 2013.

(51) Int. Cl.
*F16K 31/06* (2006.01)
*F16K 15/18* (2006.01)
(Continued)

(52) U.S. Cl.
CPC ........... *F16K 31/0634* (2013.01); *F16K 11/04* (2013.01); *F16K 11/048* (2013.01); *F16K 15/183* (2013.01);
(Continued)

(58) Field of Classification Search
CPC ................ Y10T 137/87169; Y10T 137/87193; Y10T 137/87209; Y10T 137/8667; Y10T 137/86718; Y10T 137/86759; Y10T 137/86767; Y10T 137/86815; Y10T 137/86879; Y10T 137/87861; Y10T 137/86485; F16K 31/12; F16K 11/04; F16K 15/18; F16K 31/0634; F16K 15/183; F16K 31/062; F16K 31/06; F16K 11/048; F16K 17/046
(Continued)

(56) References Cited

U.S. PATENT DOCUMENTS 2,068,102 A * 1/1937 Gaines ................ F16K 31/1245
137/245.5
4,276,960 A * 7/1981 Webb .................. F04C 29/0014
137/115.14
(Continued)

FOREIGN PATENT DOCUMENTS

CN 1435577 A 8/2003
CN 1894529 A 1/2007
(Continued)

*Primary Examiner* — Craig J Price
(74) *Attorney, Agent, or Firm* — Quinn Law Group, PLLC

(57) ABSTRACT

A valve assembly includes a valve body with an interior cavity and a primary supply port, a secondary supply port, a control port, and an exhaust port each extending to the interior cavity. An armature assembly is configured to move within the interior cavity from a first position to a second position when the coil is energized. A regulator body is operatively connected to the valve body and has an exhaust passage positioned at the exhaust port. A regulator valve in the regulator body is configured to prevent flow out of the exhaust passage when fluid pressure on the regulator valve is at or below a pilot pressure and permit flow out of the exhaust passage when fluid pressure on the regulator valve is greater than the pilot pressure. The valve body is configured to provide fluid from the secondary supply port to the control port.

16 Claims, 4 Drawing Sheets

(51) Int. Cl.
*F16K 31/12* (2006.01)
*F16K 11/04* (2006.01)
*F16K 11/048* (2006.01)
*F16K 17/04* (2006.01)

(52) U.S. Cl.
CPC ......... *F16K 17/0406* (2013.01); *F16K 31/062* (2013.01); *F16K 31/12* (2013.01); *Y10T 137/86485* (2015.04)

(58) Field of Classification Search
USPC ................ 137/596, 596.14, 596.17, 625.25, 625.28,137/625.33, 625.34, 625.4, 625.48, 881, 625.64
See application file for complete search history.

(56) References Cited

U.S. PATENT DOCUMENTS

| | | | |
|---|---|---|---|
| 4,582,082 A * | 4/1986 | Tosseghini | F16K 31/1221 137/270 |
| 4,938,022 A * | 7/1990 | Hirata | E02F 9/2225 137/596.14 |
| 5,025,625 A * | 6/1991 | Morikawa | E02F 3/42 137/596 |
| 7,921,880 B2 * | 4/2011 | Jackson | F15B 11/042 137/881 |
| 8,353,313 B2 * | 1/2013 | Dinkel | F16K 31/0624 137/107 |
| 8,459,218 B2 * | 6/2013 | Keller | F01L 13/0005 123/90.12 |
| 2003/0213523 A1 | 11/2003 | Neff | |
| 2009/0050222 A1 * | 2/2009 | Jackson | F15B 11/042 137/625.65 |
| 2012/0222634 A1 | 9/2012 | Dinkel et al. | |

FOREIGN PATENT DOCUMENTS

| | | |
|---|---|---|
| CN | 101233355 A | 7/2008 |
| CN | 101929363 A | 12/2010 |
| CN | 203431245 U | 2/2014 |
| DE | 102006036615 A1 | 2/2008 |
| JP | H0914481 A | 1/1997 |
| JP | H10332028 A | 12/1998 |
| WO | 2014142855 A1 | 9/2014 |

* cited by examiner

SOLENOID VALVE ASSEMBLY WITH PILOT PRESSURE CONTROL

CROSS-REFERENCE TO RELATED APPLICATION

This application is a bypass continuation application of International Application No. PCT/US2013/031123 filed Mar. 14, 2013, which is incorporated by reference in its entirety.

TECHNICAL FIELD

The present teachings generally include a solenoid valve assembly for fluid control.

BACKGROUND

Solenoid valves can be activated by current flowing through a coil to create an electromagnetic field that causes movement of an armature within the valve. Solenoid control valves for hydraulic control systems can be used to control fluid under pressure, such as to switch latch pins in switching lifters and lash adjusters in engine valve systems.

A solenoid valve can be energized to permit fluid to flow through a control passage to the hydraulic component. The time to fill the control passage with pressurized fluid slows the desired response of the component. Additionally, if air is permitted to enter the control passage, actuation of the component by the fluid can be slower or less precise.

SUMMARY

A valve assembly is disclosed that enables a pilot pressure to be continuously provided in a control passage to a fluid actuated component to alleviate the problem of air in the passage and to shorten actuation response time. The valve assembly includes a selectively energizable coil, a valve body, and an armature assembly. The valve body defines an interior cavity and has a primary supply port, a secondary supply port, a control port, and an exhaust port each extending to the interior cavity. The armature assembly is configured to move within the interior cavity from a first position to a second position when the coil is energized. A regulator body is operatively connected to the valve body and has an exhaust passage positioned at the exhaust port. A regulator valve in the regulator body is configured to prevent flow out of the exhaust passage when fluid pressure on the regulator valve is not greater than a predetermined pilot pressure and permit flow out of the exhaust passage when fluid pressure on the regulator valve is greater than the predetermined pilot pressure. The valve body and armature assembly are configured to permit fluid from the secondary supply port to the control port at the predetermined pilot pressure, and block flow from the primary supply port to the control port when the armature is in one of the first position and the second position. The valve body and the armature assembly are configured to permit fluid from the primary supply port to the control port at a supply pressure greater than the predetermined pilot pressure when the armature is in the other of the first position and the second position.

The above features and advantages and other features and advantages of the present teachings are readily apparent from the following detailed description of the best modes for carrying out the present teachings when taken in connection with the accompanying drawings.

DETAILED DESCRIPTION

Figure 1:
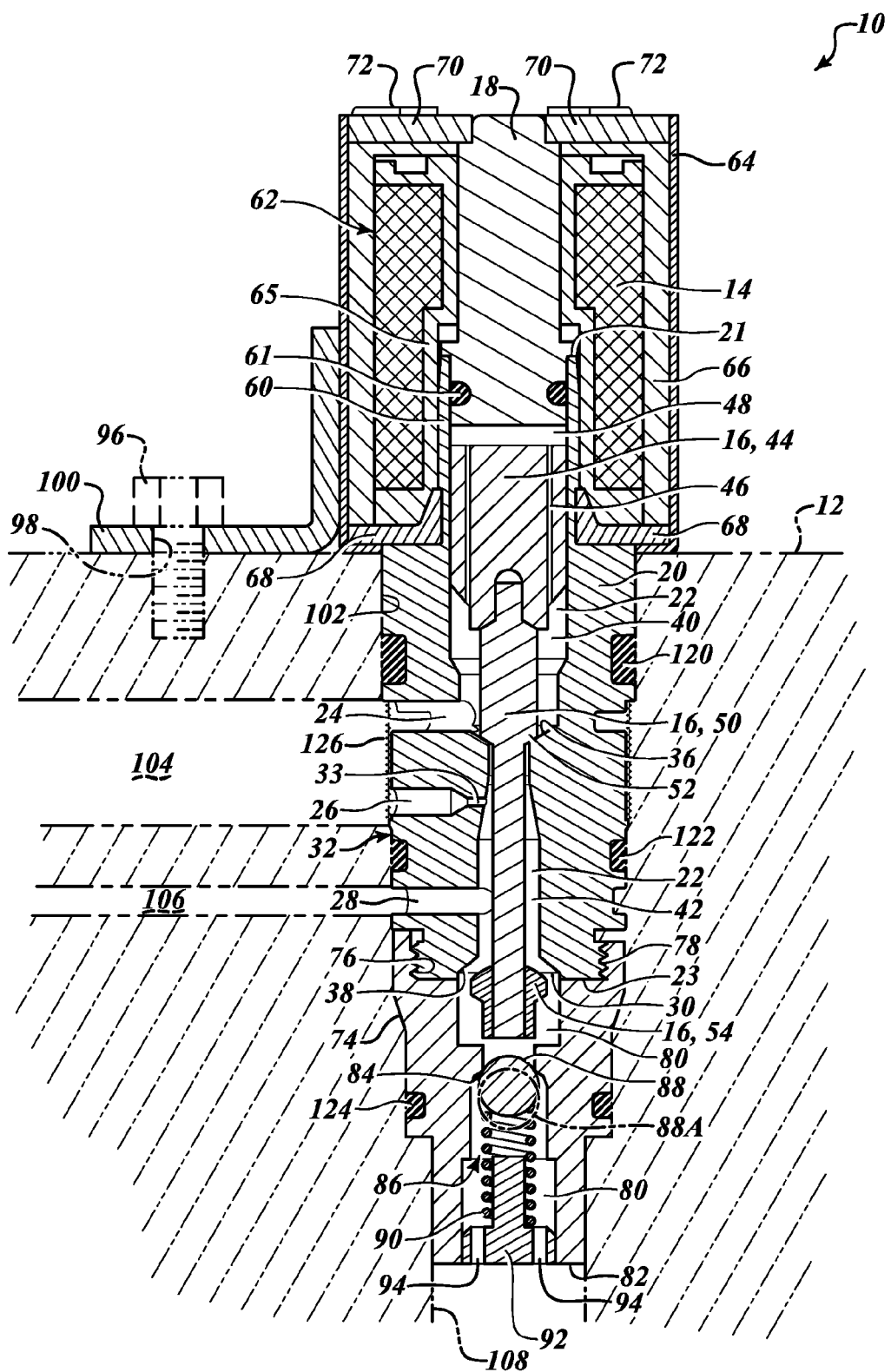
FIG. 1 is a schematic cross-sectional illustration of a solenoid valve assembly taken at lines 1-1 in FIG. 3, showing an armature assembly in a first position, and a regulator valve in a closed position and in an open position in phantom.

Referring to the drawings, wherein like reference numbers refer to like components throughout the several views, FIG. 1 shows a valve assembly 10 mounted to an engine cylinder block 12, shown in phantom, and operable to control fluid flow within the cylinder block 12 as described herein. The valve assembly 10 can be referred to as a solenoid valve assembly as it includes an energizable coil 14 that creates an electromagnetic flux path when energized to move an armature assembly 16 toward a pole piece 18.

Figure 4:
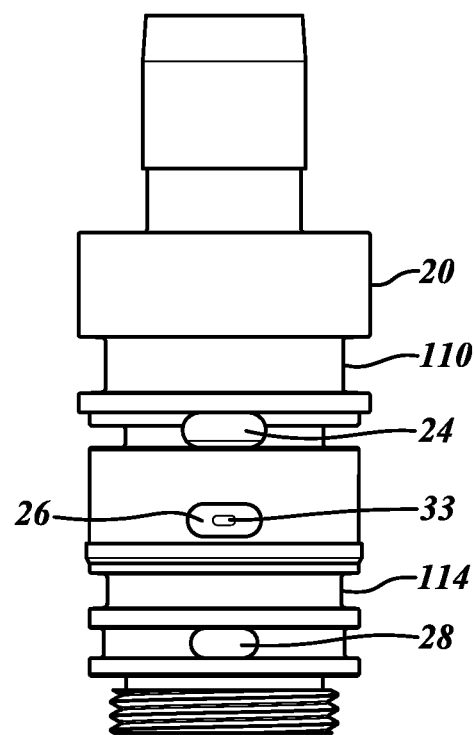
FIG. 4 is a schematic side view illustration of a valve body of the solenoid valve assembly of FIGS. 1-3.

The valve assembly 10 includes a valve body 20 with an interior cavity 22 that extends through the valve body 20 from a first end 21 to a second end 23 of the valve body 20. The valve body 20 defines a primary supply port 24, a secondary supply port 26, a control port 28, and an exhaust port 30. Each of the primary supply port 24, the secondary supply port 26, and the control port 28 extend from an external surface 32 of the valve body 20 to the interior cavity 22. The secondary supply port 26 tapers to a restriction 33 that is narrower, and thus more restrictive to fluid flow than the primary supply port 24. FIG. 4 shows the secondary supply port 26 and the restriction 33. The exhaust port 30 is at the second end 23 of the valve body 20.

The valve body 20 forms a first valve seat 36 and a second valve seat 38. The first valve seat 36 is between the primary supply port 24 and the secondary supply port 26. The second valve seat 38 is between the control port 28 and the exhaust port 30. Thus, both the secondary supply port 26 and the control port 28 are between the valve seats 36, 38. The valve seats 36, 38 effectively divide the interior cavity 22 into a supply chamber 40, and a control chamber 42.

The armature assembly 16 includes three separate components interconnected to move within the interior chamber 22 as a unit. First, the armature assembly 16 includes an armature 44 sized to substantially fill the interior cavity 22 adjacent the pole piece 18. The armature 44 can slide within the interior cavity in response to the energization or deenergization of the coil 14. A gap 48 between the pole piece 18 and the armature 44 can be an air gap. Passages 46 permit oil to move between the supply chamber 40 and the gap 48 as the armature 44 moves.

Second, the three piece armature assembly 16 includes a valve stem 50 that is threaded or otherwise secured to the armature 44. The valve stem 50 forms a first poppet 52 that is configured to seat at the first valve seat 36 when the armature assembly 16 is in the first position shown in FIG. 1. When the first poppet 52 is seated, fluid cannot flow from the supply chamber 40 to the control chamber 42 past the first valve seat 36.

Finally, the three-piece armature assembly 16 includes a second poppet 54 that is threaded, pinched, or otherwise secured to an end of the valve stem 50. The valve stem 50 is of sufficient length so that the second poppet 54 is spaced from the second valve seat 38 when the armature assembly 16 is in the first position of FIG. 1. Accordingly, fluid can flow past the second valve seat 38 from the control chamber 42.

Figure 2:
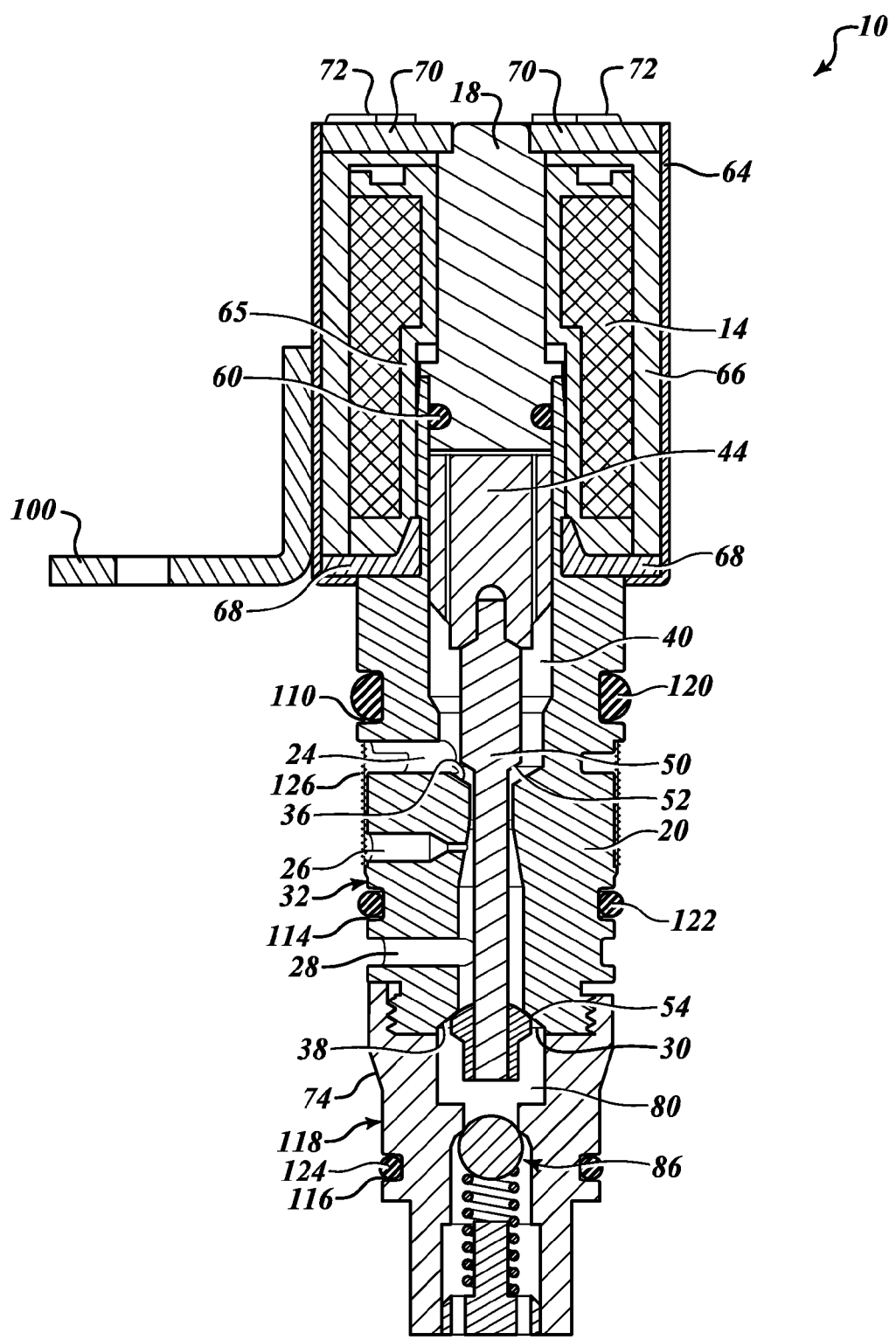
FIG. 2 is a schematic cross-sectional illustration of the solenoid valve assembly of FIG. 1 with the armature assembly in a second position.

When the armature assembly 16 is moved to the second position of FIG. 2, such as by energizing the coil 14 (or by deenergizing the coil 14 if the coil 14 is energized in FIG. 1), with the armature assembly 16 drawn toward the pole piece 18, then the second poppet 54 will be seated at the second valve seat 38, and the first poppet 52 will be spaced from the first valve seat 36, as shown in FIG. 2. When the second poppet 54 is seated at the second valve seat 38, fluid cannot flow from the control chamber 42 past the exhaust port 30. Because the first poppet 52 is spaced from the first valve seat 36, fluid can flow from the primary supply port 24 to the control chamber 42 and the control port 28.

Figure 3:
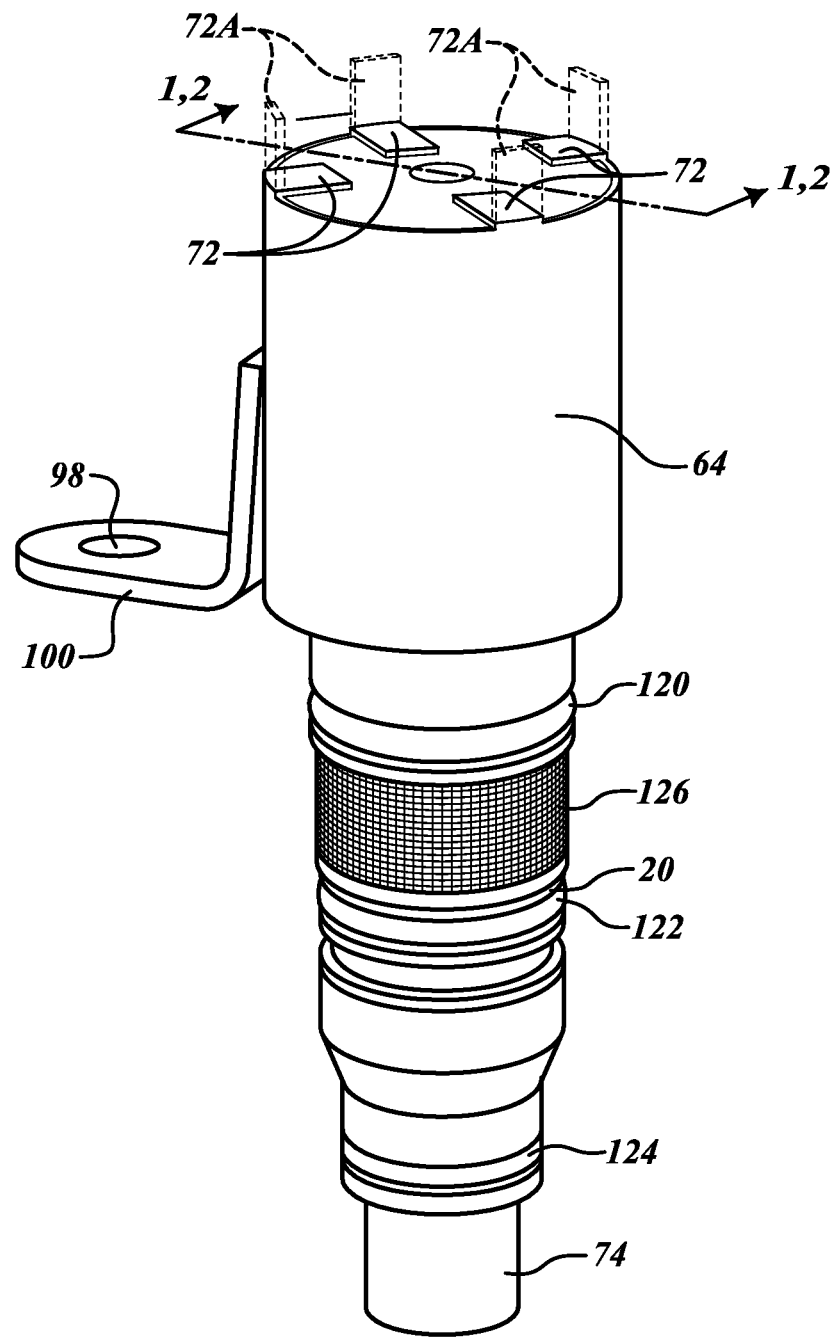
FIG. 3 is a schematic perspective illustration of the solenoid valve assembly of FIG. 1.

The valve body 20 includes a tubular distal portion 60 that is secured within a coil assembly 62 and solenoid can cover 64. A seal 61 fit within a groove of the pole piece 18 seals to the distal portion 60. The coil assembly 62 includes the annular coil 14 which is wound around an annular bobbin 65. A mold portion 66 surrounds the bobbin 65 and fits within the can cover 64. An annular flux collector 68 is housed in the can cover 64 on the valve body 20 surrounding the armature 44. A cap 70 overlays the bobbin 65 and surrounds an end of the pole piece 18. Tabs 72 bent from the can cover 64 secure the cap 70 within the can cover 64. FIG. 3 shows the tabs 72 in a first position 72A in phantom prior to being bent.

When the coil 14 is energized, such as by a battery (not shown) that is operatively connected to the coil 14 and places a voltage across the coil 14, current will flow in the coil 14, creating a magnetic flux that causes the armature assembly 16 to move within the interior cavity 22 between the first position and the second position. In the embodiment shown herein, the armature assembly 16 is in the first position of FIG. 1 when the coil 14 is not energized, and is in the second position of FIG. 2 when the coil is energized. In alternative embodiments, the armature assembly 16 could be positioned relative to the coil 14 differently so that the armature assembly 16 would move from the second position to the first position when the coil 14 is energized.

The valve assembly 10 also includes a regulator body 74 that is secured to the valve body 20 at the second end 23 distant from the coil 14. The regulator body 74 has internal threads 76 that thread to external threads 78 of the valve body 20 adjacent the exhaust port 30. Alternatively, the regulator body 74 could be connected to the valve body 20 by bonding, press-fitting, or other means.

The regulator body 74 has an exhaust passage 80 that is aligned with the exhaust port 30 and extends through the regulator body 74 to a terminal end 82 of the regulator body 74. The regulator body 74 has a valve seat 84, referred to herein as a regulator valve seat, in the exhaust passage 80. A regulator valve 86 is positioned in the regulator body 74. The regulator valve 86 includes a check ball 88 and a spring 90 biasing the check ball 88 against the regulator valve seat 84. A plug 92 is configured to seat in the exhaust passage 80. The plug 92 has orifices 94 that permit fluid to pass from the exhaust passage 80 through the plug 92. The plug 92 is configured to support the spring 90 against the check ball 88. Although a ball 88 and spring 90 are used for the regulator valve 86, other types of valves that are biased to a closed position and that open in response to a predetermined pressure can be used instead.

The valve assembly 10 can be fastened to the cylinder block 12 via a bolt 96 (shown in phantom) or other fastener that extends through an opening 98 in a mounting bracket 100 to secure the valve assembly 10 within a valve bore 102 in the cylinder block 12. The cylinder block 12 has a supply passage 104, a control passage 106 and a sump passage 108. The supply passage 104 carries pressurized fluid, such as from a fluid pump. The control passage 106 directs the pressurized fluid to a fluid actuated component (not shown) such as an engine valve lifter. The sump passage 108 leads to a sump (not shown) for fluid exhausted from the valve assembly 10. The sump is fluidly connected to a pump that then recirculates the fluid to the supply passage 104 as needed.

The valve body 20 and regulator body 74 are configured so that when the valve assembly 10 is placed in the valve bore 102, the primary supply port 24 and the secondary supply port 26 are in fluid communication with the supply passage 104, and the control port 28 is in fluid communication with the control passage 106.

As best shown in FIG. 2, the valve assembly 10 includes a first annular groove 110 on the external surface 32 of the valve body 20, and a second annular groove 114 also on the external surface 32. The regulator body 74 has a third annular groove 116 on an external surface 118 of the regulator body 74. A first seal 120 is in the first annular groove 110, a second seal 122 is in the second annular groove 114, and a third seal 124 is in the third annular groove 116. Each of the seals 120, 122, 124 is a compliant O-ring seal. Other suitable types of seals can be used instead of O-ring seals. When the valve assembly 10 is placed in the cylinder bore 102, the compliant seals 120, 122 are compressed between the valve body 20 and the cylinder head 12, and the compliant seal 124 is compressed between the regulator body 74 and the cylinder head 12. The supply passage 104, the primary supply port 24, and the secondary supply port 26 are between the first and second seals 120, 122. A wire mesh filter 126 is secured around the valve body 20 to filter fluid entering the primary supply port 24 and the secondary supply port 26. The control passage 106 and the control port 28 are between the second and third seals 122, 124. The seals 120, 122, 124 thus prevent air outside of the cylinder block 12 from reaching the passages 104, 106, 108, and help to ensure the integrity of the various fluid routes through the valve assembly 10 and cylinder block 12. In FIG. 4, the seals 120, 122 are removed from the valve body 20 to show the grooves 110, 114

The regulator valve 86 is a passive feature of the valve assembly 10 that functions in conjunction with the actively actuated armature assembly 16 to maintain a predetermined pilot pressure in the control chamber 42 and the control passage 106 when the armature assembly 16 is in the first position of FIG. 1. With the first poppet 52 seated at the first valve seat 36, supply fluid cannot pass from the supply passage 104 to the control chamber 42 and control passage 106. The armature assembly 16 will be in the first position with the first poppet 52 seated when it is not desired to provide fluid through the control passage 106, such as when it is not desired to actuate a fluid component in communication with the control passage 106. Accordingly, the controller (not shown) does not activate the valve assembly 10. Fluid from the supply passage 104 is able to enter the control chamber 42 via the secondary supply port 26, however, as the secondary supply port 26 is between the first valve seat 36 and the second valve seat 38. The fluid that enters through the secondary supply port 26 will pass from the control chamber 42 to both the control passage 106 and the exhaust passage 80. Because of the restriction 33 in the secondary supply port 26, fluid supplied through the secondary supply port 26 will be at a lower pressure than in the supply passage 104. The restriction 33 can be sized so that the rate of fluid flow through the restriction 33 is equal to the rate of leakage from the control passage 106 downstream of the valve assembly 10. Thus, once the control passage 106 is primed with the fluid at the predetermined pressure through the secondary supply port 26, the control passage 106 will remain filled with fluid at that pressure.

The predetermined pressure is lower than a pressure required to actuate a fluid actuated component downstream of the control passage 106. Moreover, the regulator valve 86 is configured to ensure that the fluid pressure in the control chamber 42, control passage 106 and exhaust passage 80 does not rise above the predetermined pressure, so that the fluid actuated component is not unintentionally actuated. Specifically, the spring 90 has a stiffness than causes it to compress when fluid at a fluid pressure greater than the predetermined pressure acts on the check ball 88, moving the check ball 88 to the open position 88A shown in phantom. With the check ball 88 in the open position 88A, fluid exhausts from the control chamber 42 to the exhaust passage 80 past the valve seat 84, and out through orifices 94 in the plug 92. When fluid pressure is relieved in this manner, the force of the spring 90 on the check ball 88 will then overcome the force of the fluid on the check ball 88 to move the check ball 88 back to the closed position shown, so that the pressure within the chamber 42 will return to a pressure not greater than the predetermined pressure. Thus, because the secondary supply port 26 is in fluid communication with the supply chamber 40 between the two poppets 52, 54, any fluid pressure spikes that occur while the armature assembly 16 is in the first position of FIG. 1 will be relieved by the regulator valve 86.

When it is desired to actuate a fluid-actuated component downstream of the control passage 106, the electronic controller (not shown) operatively connected to the coil 14 through an electrical connector (not shown) controls a battery (not shown) to provide a voltage that causes current flow in the coil 14. The electrical connector can attach to the can 64 and extend through to the coil 14. The armature assembly 16 will be drawn toward the pole piece 18 (upward in FIG. 2), lifting the first poppet 52 off of the first valve seat 36 and seating the second poppet 54 at the second valve seat 38, as shown in FIG. 2. With the armature assembly 16 in the second position of FIG. 2, the first supply port 24 is in fluid communication with the control chamber 42, the control port 28, and the control passage 106 of FIG. 1 so that fluid is provided from the first supply port 24 to the control passage 106 at the supply pressure to actuate the fluid-actuated component. Fluid can also be provided through the secondary supply port 26 when the armature assembly 16 is in the second position. The pressure in the control chamber 42 and in the control passage 106 will be dictated by the higher supply pressure that can pass via the primary supply port 24.

When the armature assembly 16 is in the second position of FIG. 2, the regulator valve 86 does not affect the fluid pressure in the control chamber 42 as the seated second poppet 52 blocks any flow from reaching the regulator valve 96. The regulator valve 86 is thus configured to prevent flow out of the exhaust passage 80 when fluid pressure on the regulator valve 86 is not greater than the predetermined pilot pressure and permit flow out of the exhaust passage 80 when fluid pressure on the regulator valve 86 is greater than the predetermined pilot pressure and the armature assembly 16 is in the first position. The regulator valve 86 enables the control passage 106 to be precharged with fluid at the relatively low predetermined pilot pressure, enabling faster actuation of a fluid component when the valve assembly 16 is moved to the second position.

The reference numbers used in the drawings and the specification along with the corresponding components or method steps is as follows:

10 valve assembly
12 cylinder block
14 coil
16 armature assembly
18 pole piece
20 valve body
21 first end of valve body
22 interior cavity
23 second end of valve body
24 primary supply port
26 secondary supply port
28 control port
30 exhaust port
32 external surface of valve body
33 restriction
36 first valve seat
38 second valve seat
40 supply chamber
42 control chamber
44 armature
46 passages in armature
48 gap
50 valve stem
52 first poppet
54 second poppet
60 distal portion
61 seal
62 coil assembly
64 can cover
65 annular bobbin
66 mold portion
68 flux collector
70 cap
72 security tabs
72A first position of security tabs
74 regulator body
76 internal threads
78 external threads
80 exhaust passage
82 terminal end
84 regulator valve seat
86 regulator valve
88 check ball
88A open position of check ball
90 spring
92 plug
94 orifice
96 bolt
98 opening
100 mounting bracket
102 valve bore
104 supply passage
106 control passage
108 sump passage
110 first annular groove
114 second annular groove
116 third annular groove
118 external surface of regulator body
120 first seal 122 second seal
124 third seal
126 wire mesh filter While the best modes for carrying out the many aspects of the present teachings have been described in detail, those familiar with the art to which these teachings relate will recognize various alternative aspects for practicing the present teachings that are within the scope of the appended claims.

The invention claimed is:

1. A valve assembly comprising:
a selectively energizable coil;
a valve body that defines an interior cavity and has a primary supply port, a secondary supply port, a control port, and an exhaust port each extending to the interior cavity;
an armature assembly configured to move within the interior cavity from a first position to a second position when the coil is energized;
a regulator body operatively connected to the valve body and having an exhaust passage positioned at the exhaust port;
a regulator valve positioned in the regulator body and configured to prevent fluid flow out of the exhaust passage when fluid pressure on the regulator valve is not greater than a predetermined pilot pressure, and configured to permit fluid flow out of the exhaust passage when fluid pressure on the regulator valve is greater than the predetermined pilot pressure;
a first seal on an external surface of the valve body;
a second seal on the external surface of the valve body;
a third seal on an external surface of the regulator body;
wherein the primary supply port and the secondary supply port are between the first seal and the second seal; and wherein the control port is between the second seal and the third seal;
wherein the valve body and the armature assembly are configured to permit fluid flow from the secondary supply port to the control port at the predetermined pilot pressure and block fluid flow from the primary supply port to the control port when the armature is in one of the first position and the second position; and
wherein the valve body and the armature assembly are configured to permit fluid flow from the primary supply port to the control port at a supply pressure greater than the predetermined pilot pressure when the armature is in the other of the first position and the second position.

2. The valve assembly of claim 1, wherein the regulator body includes a regulator valve seat; and wherein the regulator valve includes a check ball and a spring biasing the check ball against the regulator valve seat.

3. The valve assembly of claim 2, further comprising:
a plug configured to seat in the exhaust passage; wherein the plug has an orifice that permits fluid to pass through the plug; and
wherein the plug is configured to support the spring.

4. The valve assembly of claim 1, wherein the exhaust port is further from the coil than the primary supply port.

5. The valve assembly of claim 1, wherein the valve body defines a first valve seat between the primary supply port and the control port, and a second valve seat between the control port and the exhaust port; wherein the secondary supply port is in fluid communication with the interior cavity and the control port between the first valve seat and the second valve seat;
wherein the armature assembly has a first poppet and a second poppet; wherein the first poppet is configured to seat at the first valve seat and the second poppet is configured to be spaced from the second valve seat when the armature is in the first position; and wherein the first poppet is configured to be spaced from the first valve seat and the second poppet is configured to be seated at the second valve seat when the armature is in the second position.

6. The valve assembly of claim 5, wherein the first seat is closer to the coil than the second seat, and the second seat is closer to the exhaust port than the first seat.

7. A valve assembly comprising:
a selectively energizable coil;
a valve body defining an interior cavity and having a primary supply port, a secondary supply port, a control port, and an exhaust port, each of the ports extending through the valve body to the interior cavity; wherein the valve body defines a first valve seat between the primary supply port and the control port, and defines a second valve seat between the control port and the exhaust port; wherein the secondary supply port is in fluid communication with the interior cavity and with the control port between the first valve seat and the second valve seat;
an armature assembly configured to move within the interior cavity due to magnetic flux when the coil is energized; wherein the armature assembly has a first poppet and a second poppet; wherein the first poppet is configured to seat at the first valve seat and the second poppet is configured to be spaced from the second valve seat when the coil is not energized; wherein the first poppet is configured to be spaced from the first valve seat and the second poppet is configured to be seated at the second valve seat when the coil is energized;
a regulator body operatively connected to the valve body and having an exhaust passage in fluid communication with the exhaust port; and
a regulator valve positioned in the regulator body and configured to block the exhaust passage when fluid pressure on the regulator valve is not greater than a predetermined pilot pressure, and configured to unblock the exhaust passage when fluid pressure on the regulator valve is greater than the predetermined pilot pressure; fluid thereby being permitted to the enter control port only through the secondary supply port at the predetermined pilot pressure when the coil is not energized, and being permitted to enter the control port through the primary supply port at a supply pressure greater than the predetermined pilot pressure when the coil is energized.

8. The valve assembly of claim 7, wherein the regulator body includes a regulator valve seat; and wherein the regulator valve includes a check ball and a spring biasing the check ball against the regulator valve seat.

9. The valve assembly of claim 7, further comprising:
a plug configured to seat in the exhaust passage; wherein the plug has an orifice that permits fluid to pass through the plug; and
wherein the plug is configured to support the spring.

10. The valve assembly of claim 7, wherein the exhaust port is further from the coil than the primary supply port.

11. The valve assembly of claim 7, further comprising:
a first seal on an external surface of the valve body;
a second seal on the external surface of the valve body;
a third seal on the external surface of the regulator body;

wherein the primary and secondary supply ports are between the first seal and the second seal; and wherein the control port is between the second seal and the third seal.

12. The valve assembly of claim 11 in combination with a cylinder block having a bore; wherein the cylinder block has a supply passage, a control passage, and a sump passage each of which is in communication with the bore;
   wherein the valve body and the regulator body are configured to fit within the bore with the first seal, the second seal, and the third seal sealing to the cylinder block so that the primary supply port and the secondary supply port are in communication with the supply passage, the control port is in communication with the control passage, and the exhaust port is in communication with the sump passage; the secondary supply port thus providing fluid to the control passage; and
   wherein the secondary supply port is configured to be more restrictive than the primary supply port.

13. The valve assembly of claim 12, wherein the secondary supply port is configured to permit supply fluid to the control passage substantially at a rate of leakage of fluid from the control passage.

14. The valve assembly of claim 7, wherein the valve body has a first annular groove and a second annular groove; wherein the regulator body has a third annular groove;
   wherein the first seal is a first O-ring in the first annular groove;
   wherein the second seal is a second O-ring in the second annular groove; and
   wherein the third seal is a third O-ring in the third annular groove.

15. A valve assembly comprising:
   a selectively energizable coil;
   a valve body that defines an interior cavity and has a primary supply port, a secondary supply port, a control port, and an exhaust port each extending to the interior cavity;
   an armature assembly configured to move within the interior cavity from a first position to a second position when the coil is energized;
   a regulator body operatively connected to the valve body and having an exhaust passage positioned at the exhaust port;
   a regulator valve positioned in the regulator body and configured to prevent fluid flow out of the exhaust passage when fluid pressure on the regulator valve is not greater than a predetermined pilot pressure, and configured to permit fluid flow out of the exhaust passage when fluid pressure on the regulator valve is greater than the predetermined pilot pressure;
   wherein the valve body and the armature assembly are configured to permit fluid flow from the secondary supply port to the control port at the predetermined pilot pressure and block fluid flow from the primary supply port to the control port when the armature is in one of the first position and the second position; and wherein the valve body and the armature assembly are configured to permit fluid flow from the primary supply port to the control port at a supply pressure greater than the predetermined pilot pressure when the armature is in the other of the first position and the second position;
   wherein the valve body defines a first valve seat between the primary supply port and the control port, and a second valve seat between the control port and the exhaust port; wherein the secondary supply port is in fluid communication with the interior cavity and the control port between the first valve seat and the second valve seat;
   wherein the armature assembly has a first poppet and a second poppet configured to move together in unison when the armature assembly moves from the first position to the second position; wherein the first poppet is configured to seat at the first valve seat and the second poppet is configured to be spaced from the second valve seat when the armature is in the first position; and wherein the first poppet is configured to be spaced from the first valve seat and the second poppet is configured to be seated at the second valve seat when the armature is in the second position.

16. The valve assembly of claim 15, wherein the armature assembly includes a valve stem; wherein the valve stem forms the first poppet; and wherein the second poppet is secured to the valve stem.

* * * * *